(12) United States Patent
Nousiainen et al.

(10) Patent No.: US 10,240,095 B2
(45) Date of Patent: Mar. 26, 2019

(54) PROCESS FOR PRODUCING BIOFUEL AND BIOFUEL COMPONENTS

(71) Applicant: UPM-KYMMENE CORPORATION, Helsinki (FI)

(72) Inventors: Jaakko Nousiainen, Lappeenranta (FI); Arto Rissanen, Lappeenranta (FI); Andrea Gutierrez, Lappeenranta (FI); Teemu Lindberg, Lappeenranta (FI); Heli Laumola, Helsinki (FI); Pekka Knuuttila, Porvoo (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 271 days.

(21) Appl. No.: 14/395,163

(22) PCT Filed: Apr. 17, 2013

(86) PCT No.: PCT/FI2013/050427
§ 371 (c)(1),
(2) Date: Oct. 17, 2014

(87) PCT Pub. No.: WO2013/156682
PCT Pub. Date: Oct. 24, 2013

(65) Prior Publication Data
US 2015/0057474 A1 Feb. 26, 2015

(30) Foreign Application Priority Data

Apr. 18, 2012 (FI) .................................... 20125422

(51) Int. Cl.
*C10G 3/00* (2006.01)
*C10G 21/20* (2006.01)
(Continued)

(52) U.S. Cl.
CPC ................. *C10G 3/50* (2013.01); *C10G 3/42* (2013.01); *C10G 3/46* (2013.01); *C10G 21/20* (2013.01);
(Continued)

(58) Field of Classification Search
CPC .................................... C10L 1/08; C10G 3/42
See application file for complete search history.

(56) References Cited

U.S. PATENT DOCUMENTS 3,644,179 A * 2/1972 Knoer ....................... C11E 3/12
159/6.2
5,705,722 A 1/1998 Monnier et al.
(Continued)

FOREIGN PATENT DOCUMENTS

EP 2290045 A1 3/2011
EP 2111441 8/2016
(Continued)

OTHER PUBLICATIONS

International Search Report dated Oct. 30, 2013, corresponding to PCT/FI2013/050427.
(Continued)

*Primary Examiner* — Philip Y Louie
*Assistant Examiner* — Alyssa L Cepluch
(74) *Attorney, Agent, or Firm* — Cantor Colburn LLP

(57) ABSTRACT

A process for catalytically converting crude tall oil into hydrocarbons suitable as biofuel components. The crude tall oil is treated in a reactor system including a catalytically active guard bed phase and a catalytically active main reaction phase. At least one of the phases includes a catalyst bed with a combination of hydrodeoxygenating (HDO) and hydrodewaxing (HDW) catalysts. The process provides biofuel with acceptable ignition and cold flow properties.

13 Claims, 3 Drawing Sheets

(51) Int. Cl.
*C10G 45/58* (2006.01)
*C10G 45/64* (2006.01)
*C10L 1/04* (2006.01)
*C10L 1/06* (2006.01)
*C10L 1/08* (2006.01)
*C10L 1/16* (2006.01)
*C10G 65/12* (2006.01)
*C10G 67/02* (2006.01)
*C10G 67/06* (2006.01)

(52) U.S. Cl.
CPC ............. *C10G 45/58* (2013.01); *C10G 45/64* (2013.01); *C10G 65/12* (2013.01); *C10G 67/02* (2013.01); *C10G 67/06* (2013.01); *C10L 1/04* (2013.01); *C10L 1/06* (2013.01); *C10L 1/08* (2013.01); *C10L 1/1616* (2013.01); *C10G 2300/1011* (2013.01); *C10G 2300/1014* (2013.01); *C10L 2200/0469* (2013.01); *C10L 2200/0484* (2013.01); *C10L 2270/026* (2013.01); *C10L 2290/541* (2013.01); *Y02E 50/13* (2013.01); *Y02P 30/20* (2015.11)

(56) References Cited

U.S. PATENT DOCUMENTS

| | | | |
|---|---|---|---|
| 7,638,040 B2 * | 12/2009 | Van Wees | C10G 7/003 208/143 |
| 8,608,812 B2 | 12/2013 | Perego et al. | |
| 8,735,637 B2 | 5/2014 | Stiggson et al. | |
| 2005/0033027 A1 | 2/2005 | Rohr et al. | |
| 2007/0010682 A1 | 1/2007 | Myllyoja et al. | |
| 2009/0283442 A1 * | 11/2009 | McCall | C10G 3/46 208/15 |
| 2010/0038284 A1 | 2/2010 | Vergel | |
| 2010/0043279 A1 * | 2/2010 | Abhari | C10G 45/02 44/308 |
| 2010/0113848 A1 * | 5/2010 | Strege | C10G 3/46 585/240 |
| 2010/0228062 A1 * | 9/2010 | Babicki | C01B 3/56 585/240 |
| 2011/0042267 A1 * | 2/2011 | Hayasaka | B01J 29/064 208/27 |
| 2011/0166396 A1 | 7/2011 | Egeberg et al. | |
| 2012/0004479 A1 | 1/2012 | Hanks et al. | |
| 2012/0016167 A1 * | 1/2012 | Hanks | C10G 3/46 585/14 |
| 2012/0260565 A1 * | 10/2012 | Nousiainen | C10G 3/46 44/388 |
| 2013/0245301 A1 | 9/2013 | Nousiainen et al. | |

FOREIGN PATENT DOCUMENTS

| | | |
|---|---|---|
| WO | 2008101945 A1 | 8/2008 |
| WO | 2009125072 A1 | 10/2009 |
| WO | 2009131510 A1 | 10/2009 |
| WO | 2009151690 A2 | 12/2009 |
| WO | 2010097519 A2 | 9/2010 |
| WO | 2010128208 A2 | 11/2010 |
| WO | 2011095688 A2 | 8/2011 |
| WO | 2011117474 A1 | 9/2011 |
| WO | 2011148045 A1 | 12/2011 |
| WO | 2012069705 A1 | 5/2012 |
| WO | 2012069706 A2 | 5/2012 |
| WO | 2012143613 A1 | 10/2012 |

OTHER PUBLICATIONS

J. Mikulec, et al.; "Production of Diesel Fuels From Waste Triacylglycerols by Hydrodeoxygenation"; Sep. 22, 2009; pp. 1-15.
Liu, D.D.S. et al. "Production of High Quality Cetane Enhancer From Depitched Tall Oil" Petroleum Science and Technology, 1998, vol. 16, Issue 5 & 6, pp. 597-609.
McSweeney, E. E. Et al., "Tall Oil and Its Uses—II", Pulp Chemicals Association , Inc. 1987; pp. 12-18.
Gruia, Adrian, "Hydrotreating", Handbook of Petroleum Processing, (David Stan, Ed.), Springer (2006); pp. 321-354.
Heinrich, Gerard, et al.,"Hydrotreating", Conversion Processes, vol. 3, (P. Leprince Ed.) in Petroleum Refining, Institut Francais du Petrol Publication, (2001); p. 560.
Mikulec, J.et al., "Catalytic Transformation of Tall Oil into Biocomponent of Diesel Fuel", International Journal of Chemical Enginneering, vol. 2012, Article ID 215258; 9 pages.
Norlin Lars-Hugo, "Tall Oil", (2005), Ullmann's Encyclopedia of Industrial Chemistry, Wiley-VCH Verlag GmbH & Co. KGaA, Weinheirn; 14 pages.

* cited by examiner

PROCESS FOR PRODUCING BIOFUEL AND BIOFUEL COMPONENTS

FIELD OF THE INVENTION

The present invention relates to a process for producing biofuel or biofuel components from material of biological origin by a catalytic method. An embodiment of the invention relates to a process for producing biofuel from crude tall oil. The present invention further relates to the use of a product of the process as fuel or fuel additive and to diesel fuel produced by the process.

BRIEF DESCRIPTION OF THE INVENTION

In the process of the present invention, a biological feed material is treated in a reactor system comprising a catalytically active guard bed phase and a catalytically active main reaction phase. At least one of the phases comprises a catalyst bed with a combination of hydrodeoxygenating (HDO) and hydrodewaxing (HDW) catalysts. The process provides biofuel with acceptable ignition and cold flow properties.

An object of the present invention is to provide a process for converting biological feed material into hydrocarbons useful as fuel and/or additives for fuel.

An object of the invention is also to provide a process suitable for converting tall oil components into hydrocarbons suitable for use as or in fuels.

Another object of the present invention is to provide a process to alleviate disadvantages of processes known in the art. The objects of the invention are achieved by a process characterized by what is stated in the independent claims. Specific embodiments of the invention are disclosed in the dependent claims.

DETAILED DESCRIPTION OF THE INVENTION

Figure 1:
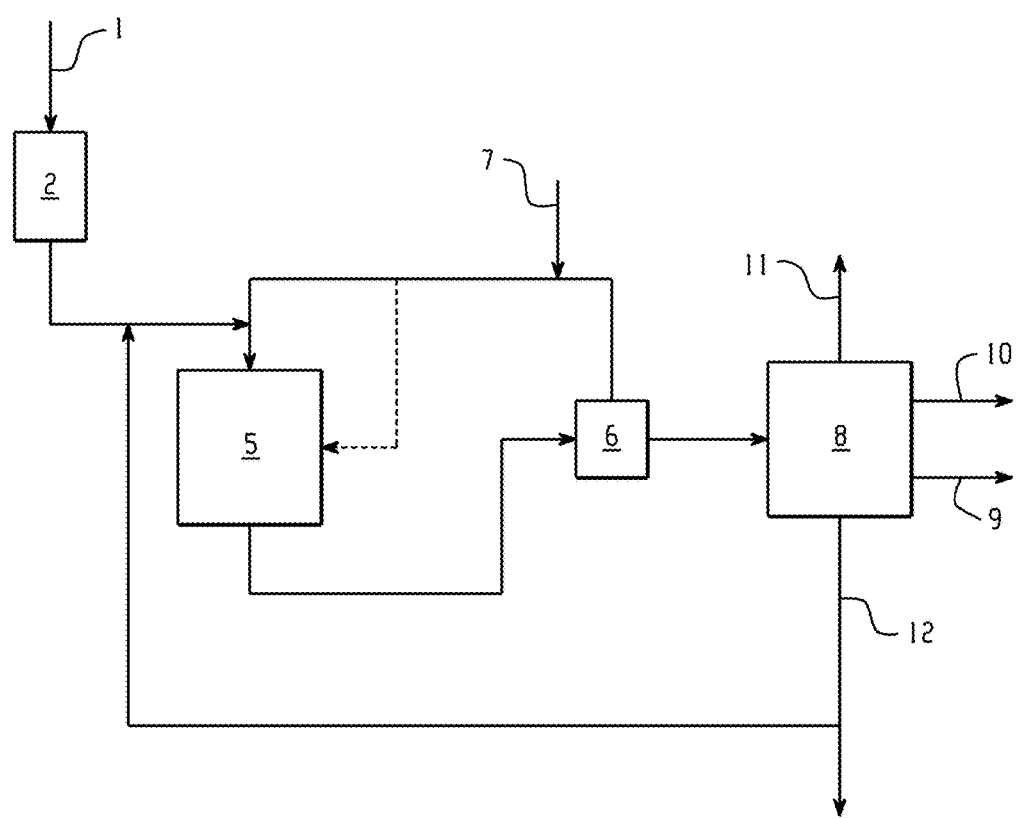
FIG. 1 shows a diagram illustrating an embodiment of the process of the invention.

The present invention relates to a process for producing biofuel or biofuel components, comprising
feeding of biological material into a reactor system, which comprises a catalytically active guard bed phase and a catalytically active main reaction phase and wherein the feed material, in at least one catalyst bed of said phases, is contacted with a combination of hydrodeoxygenating (HDO) and hydrodewaxing (HDW) catalysts,
treating the feed material catalytically with hydrogen in the reactor system to cause hydrodeoxygenation, isomerisation and cracking of feed material components to provide a hydroprocessing product, and
recovering at least a fraction of the hydroprocessing product as biofuel or biofuel components.

In the process of the invention a variety of hydrogen promoted (hydroprocessing) reactions take place on the catalysts. These reactions are necessary for converting the biological feed into acceptable fuel or fuel components. Providing a combination of active HDO and HDW catalysts in the same catalyst bed(s) in accordance with the invention enables all conversion reactions to proceed at the same time in said catalyst beds.

In an embodiment of the invention, the combination of HDO and HDW catalysts comprises mixture(s) or layers of the catalysts. The mixture(s) may be provided by physically mixing HDO and HDW catalyst particles or by adding HDO and HDW catalyst components onto same support material.

In an embodiment of the invention the main reaction phase comprises two or more main catalyst beds with their respective combinations of HDO and HDW catalysts. When the main reaction phase comprises two or more main catalyst beds, these typically operate in series. It is also possible to have main catalyst beds operating in parallel.

In an embodiment of the invention the proportion of HDW catalyst grows towards the outlet end of the reactor system. Some catalyst beds of the reaction phase typically comprise only one or the other of the catalyst types, i.e. they comprise either HDO or HDW catalyst.

In an embodiment of the invention the feed material after the guard bed phase passes through the main catalyst beds of the reactor system in series as a continuous flow without outlets for byproducts or other side streams. The main catalyst beds may be provided in one pressure vessel. In an embodiment of the invention the catalyst beds are split among several pressure vessels.

The treatment of the feed material with hydrogen, i.e. the hydroprocessing provides a mixture of gaseous and liquid hydrocarbons, water and some mostly gaseous byproducts such as $H_2S$, CO and $CO_2$. The liquid hydrocarbon product can be used as such or it may be fractionated to yield a variety of desired hydrocarbon fractions with different boiling points. In an embodiment of the invention a diesel fraction is recovered. Furthermore, a naphtha fraction can be recovered. A heavy fraction is typically also produced and it may be recovered or recirculated wholly or in part to the inlet end of the reactor system.

The invention also relates to the use of a hydrocarbon fraction produced by the process of the invention as a fuel or as an additive in fuel compositions. A middle distillate of the liquid hydrocarbon product comprises a fuel product having characteristics meeting specification EN 590 diesel. It comprises at least one hydrocarbon fraction produced by the process of the invention.

Even though the middle distillate of the process might not always meet all the EN 590 specifications, a fuel product meeting most of the specifications can be produced by the process. Thus, the process produces paraffinic fuel or fuel components which is/are similar to EN 590 diesel and which has/have low aromatic content, high cetane number and acceptable cold flow properties.

The process of the invention is operated in a reactor system, which comprises at least one catalytically active guard bed phase and at least one catalytically active main reaction phase. The two phases may be physically combined into one unit. At least one of said phases comprises a catalyst bed, wherein hydrodeoxygenating (HDO) and hydrodewaxing (HDW) catalysts are combined with each other.

The active HDO and HDW catalysts may be combined by being mixed with each other or they may be provided in separate layers or compartments within the same catalyst bed. The mixed catalysts may be provided by physically mixing different catalyst particles. The active catalytic components may also be combined during production of the catalyst, e.g. by being added onto the same support material(s). The catalyst layers may be provided by layering during packing of the bed.

The combination of the catalysts need not be uniform. Thus, a catalyst bed may contain more of the HDO or more of the HDW catalyst(s) in the flow direction. There may be different types of HDO catalysts and/or HDW catalysts in a bed. Similarly, there may be several layers of the various catalysts in a catalyst bed and the layers need not be of equal size. For example, when catalyst particles having different shapes and sizes are used, it may be advantageous to pack the catalysts into the bed in a graded manner to influence the operating pressure and temperature properties of the reactor. The reactor system typically also comprises catalyst beds with only one type of catalyst, i.e. HDO or HDW. Thus, for instance, the last catalyst bed of the main reaction phase may comprise only HDW catalyst.

The biological feed material can be any kind of animal and/or plant based material suitable for producing fuel components. In an embodiment, the feed material comprises plant oil which is obtained as a by-product from the forest industry.

In one embodiment of the invention, the feed material is composed of crude tall oil (CTO). In a further embodiment of the invention, the feed of biological material comprises tall oil components such as tall oil fatty acids (TOFA). A combination of CTO and TOFA may also be used. In an embodiment of the invention the feed material is selected from the group consisting of crude tall oil (CTO), tall oil fatty acids (TOFA), tall oil derivatives such as tall oil resin acids, tall oil pitch and tall oil neutral substances, as well as any mixtures thereof. Any one tall oil component or derivative may be used also as a feed material or may be combined with other tall oil derivatives, other biological oil feeds or mineral oil feeds.

The term "crude tall oil" or "CTO" refers to a product which is mainly composed of both saturated and unsaturated oxygen-containing organic compounds such as rosins, unsaponifiables, sterols, resin acids (mainly abietic acid and its isomers), fatty acids (mainly linoleic acid, oleic acid and linolenic acid), fatty alcohols, sterols and other alkyl hydrocarbon derivatives. The handling and cooking of the wood causes break down of the triglyceride structures and hence CTO does not contain any significant amounts of triglycerides. Typically, CTO contains minor amounts of impurities such as inorganic sulphur compounds, residual metals such as Na, K, Ca and phosphorus. The composition of the CTO varies depending on the specific wood species. CTO is derived from pulping of coniferous wood.

The fatty acids of tall oil include mainly palmitic acid, oleic acid and linoleic acid. The term "tall oil fatty acids" or "TOFA" refers to a product which is obtained from tall oil. Fractional distillation of tall oil provides rosin acids and further reduction of the rosin content provides tall oil fatty acids (TOFA) which consists mostly of oleic acid.

In the present invention, the raw material can be purified before it is subjected to further treatments or it can be utilized in unpurified form. Purification of the raw material facilitates the performance of the process of the invention. Purification can be accomplished in any appropriate manner, such as by means of washing with washing liquid, filtering, distillation, degumming, depitching, evaporating etc. Also, a combination of the above mentioned purification methods can be used.

In an embodiment of the invention the feed material comprises CTO and the purification is provided by evaporation. A series of two or more evaporators at elevated temperatures and reduced pressures may be used. When the evaporation is performed in more than one step the evaporation takes place in a more controlled manner. The multi-step evaporation also makes it possible to accomplish the evaporation in such a manner that the amount of residue removed by the purification is very small, typically ranging from 5% to 15%, In an embodiment of the invention, the purification process conditions are controlled in such a way that as much as possible of the neutral components of the tall oil material are recovered for further utilization instead of being withdrawn with the residue. The content of harmful substances, such as metal ions, sulphur, phosphorus and lignin residuals in the CTO raw material, is reduced by the purification. Purification of the feed enhances catalyst performance and lifetime.

In an embodiment of the invention, the whole amount of feed material or a part of it comprises purified CTO. The CTO can be carefully purified by evaporative treatments to remove light components such as crude sulphate turpentine (CST) and heavy components such as tall oil pitch. Such purified CTO material is eminently suitable for being subjected to catalytic treatment with hydrogen and for providing an acceptable biofuel product with a very high yield.

In the process of the present invention, the optionally purified biological raw material is heated and fed into a reactor system, where it is subjected to catalytic hydrogenation, isomerisation and cracking on a mixture of catalysts capable of all of these reactions.

The process of the invention comprises reactions on at least two separate catalysts, one being a hydrodeoxygenation or HDO catalyst and the other a hydrodewaxing or HDW catalyst. One or more HDO catalysts and one or more HDW catalysts are combined with each other in at least one catalyst bed of the reactor system. The combination may be provided in different ways such as by mixing or layering. A mixture may be provided by physical mixing of catalyst particles or by adding catalyst metals onto the same support.

In the present invention, the HDO catalyst can be any HDO catalyst known in the art for the removal of hetero atoms (O, S, N) from organic compounds. In an embodiment of the invention, the HDO catalyst is selected from a group consisting of NiMo, CoMo, and a mixture of Ni, Mo and Co. A NiMo catalyst has proven very efficient in the process of the invention. The support for the HDO catalyst can be any oxide which is typically used in the art as support for HDO catalysts. The support is typically selected from $Al_2O_3$, $SiO_2$, $ZrO_2$, and mixtures thereof.

In an embodiment of the invention, solid particles of $NiMo/Al_2O_3$ or, $NiMo/SiO_2$ are used. In another embodiment $CoMo/Al_2O_3$, or $CoMo/SiO_2$ is used. In a further embodiment $NiMoCo/Al_2O_3$ or, $NiMoCo/SiO_2$ is used. It is also possible to use a combination of HDO catalysts. The HDO catalyst(s) is/are sulphided prior to start up. Adequate sulphidation during operation is usually provided by organic sulphur compounds contained in the feed material.

In an embodiment of the invention, the HDW catalyst is selected from hydrodewaxing catalysts typically used for isomerising paraffinic hydrocarbon feeds. Examples of HDW catalysts include catalysts based on Ni, W, and molecular sieves.

NiW is a HDW catalyst which is useful in the invention. It has excellent isomerising and dearomatising properties and it also has the capacity of performing the hydrodeoxygenation and other hydrogenation reactions of biological feed materials, which are typically performed by HDO catalysts. Aluminosilicate molecular sieves and especially zeolites with medium or large pore sizes are also useful as HDW catalysts in the present invention. Typical commercial zeolites useful in the invention include for instance ZSM-5, ZSM-11, ZSM-12, ZSM 22, ZSM-23 and ZSM 35. Other useful zeolites are zeolite beta and zeolite Y.

The HDW catalyst is also supported on an oxide support. The support materials may be the same as or different from those of the HDO catalyst. In an embodiment of the invention the HDW catalyst is selected from $NiW/Al_2O_3$ and $NiW/zeolite/Al_2O_3$. These HDW catalysts are especially well suited for combining with the HDO catalyst of the invention since they also require sulphiding for proper catalytic activity.

In a specific embodiment, a catalyst bed of the main reaction phase of the reactor system comprises a combination of sulphided HDO and HDW catalysts, wherein the HDO catalyst is $NiMo/Al_2O_3$ and the HDW catalyst is $NiW/zeolite/Al_2O_3$. The $NiMo/Al_2O_3$ catalyst mainly serves the purpose of hydrogenation, hydrodeoxygenation, hydrodesulphurization and hydrodenitrification. The $NiW/zeolite/Al_2O_3$ catalyst mainly serves the purpose of hydroisomerisation, hydrogenation, hydrodearomatising, and hydrocracking. However, as mentioned above, NiW has the capacity also for some hydrodeoxygenation, hydrodesulphurisation and hydrodenitrification of the biological raw material.

In an embodiment of the invention the HDW catalyst is mixed with HDO catalyst in the first catalyst bed at the inlet end where the feed enters the main reaction phase. In case there are two or more catalyst beds in the main phase, the HDO and HDW catalysts are typically mixed in at least two of the main catalyst beds of the reactor system.

The proportion of HDO catalyst at the inlet end of the main reaction phase is typically higher than the proportion of HDW catalyst. In an embodiment of the invention the proportion of the HDW catalyst grows towards the outlet end of the reactor system. The last catalyst bed in the main reaction phase typically comprises only of HDW catalyst.

The proportion of HDO and HDW catalysts in the catalyst combination may vary depending on the feed material and the amount of hetero atoms, aromatic compounds and other impurities therein. The proportion of NiW and zeolite in the NiW/zeolite catalyst may also vary. As a general rule, NiW is the most abundant of the active catalysts in the reactor system. The skilled person will be able to select suitable catalyst compositions based on his knowledge of the feed, the reaction parameters and the desired distillate specification(s). For instance, a feed having a high amount of aromatics will require a relatively higher amount of HDW catalyst for cracking than is necessary for a feed with a low amount of aromatics.

In an embodiment of the invention the reactor system contains one main reaction phase. The first catalyst bed calculated in the flow direction of the main phase contains a combination of 50, 60, 70, 80, 90 or 95% by weight HDO catalyst and 5, 10, 20, 30, 40 or 50% by weight HDW catalyst. The last catalyst bed of the main phase contains 100% by weight HDW catalyst. In an embodiment there is a middle catalyst bed which contains 5, 10, 20, 30 or 50% by weight HDO catalyst and 50, 60, 70, 80, 90 or 95% by weight HDW catalyst.

In a specific embodiment the reactor system comprises a main phase with several catalyst beds operating in series. In an embodiment the first catalyst bed comprises 75 to 95% by weight $NiMo/Al_2O_3$ or $CoMo/Al_2O_3$ catalyst and 5 to 25% by weight $NiW/zeolite/Al_2O_3$ catalyst. The second catalyst bed comprises 2 to 15% by weight $NiMo/Al_2O_3$ or $CoMo/Al_2O_3$ catalyst and 85 to 98% by weight $NiW/zeolite/Al_2O_3$ catalyst. The third and fourth catalyst beds both comprise 100% $NiW/Al_2O_3$ or $NiW/zeolite/Al_2O_3$ catalyst.

The reactor system of the present invention also comprises at least one catalytically active guard bed phase upstream of the main reaction phase. The purpose of the guard phase is to protect the main phase catalyst(s) from poisoning and fouling. The guard phase also prolongs the active operating time of the main phase catalysts. There are preferably two or more guard beds in series in the reactor system. The guard bed(s) may be combined in the same pressure vessel as the main catalyst beds or they may be provided in separate pressure vessel(s).

At least one of the guard beds contains active catalyst material for the removal of metals, sulphur and phosphor present in the feed. The catalytically active materials are typically selected from Ni, Co, Mo, W, zeolites, $Al_2O_3$, $SiO_2$ and mixtures thereof.

In an embodiment of the invention at least one guard bed contains a combination of HDO catalyst and HDW catalyst. When the reactor system comprises two or more guard beds, at least one of the guard catalyst beds typically comprises HDW catalyst combined with HDO catalyst. The catalysts in question may contain the same active components as those described for the main phase above. However, the catalytic activity of the guard bed catalysts is typically lower than that of the main phase catalyst. For instance the NiMo catalyst used in a guard phase has a low hydrogenation activity and serves for demetallizing the feed, while the NiMo in the main phase has a high activity for hydrodeoxygenation. A combination of catalysts in a guard bed thus protects the main phase catalysts by removing metals, sulphur, phosphorus, etc. from the feed.

In an embodiment of the invention HDO and HDW catalysts are combined in two or more catalyst beds of the reactor system. Typically one of said catalyst beds is located in a guard phase and another one is located in a main phase. In a further embodiment at least two main catalyst beds comprise a combination of HDO and HDW catalysts.

The guard beds and/or the main catalyst beds may comprise an inert layer at the inlet ends of the reactors and also between the catalyst beds. The catalysts may also be diluted with appropriate inert mediums. Dilution of the active catalysts serves to even out the exothermic reactions and to facilitate temperature control in the reactor(s). Examples of inert media include glass spheres and silica. In one embodiment of the invention, at least one of the catalysts is diluted with an inert material.

In the process of the invention the biological feed material is fed from a feed tank to the reactor system. In an embodiment, the feed material is purified before entering the reactors. The purification is selected to suit the biological material in question.

According to one embodiment of the invention the feed comprises crude tall oil (CTO) and the purification is performed by using a heater and evaporator combination. In this embodiment, the CTO is first heated up under vacuum. A suitable temperature is 150 to 230° C. at a pressure of 40 to 80 mbar. The gas phase containing CST (Crude Sulfate Turpentine) and water is separated. The liquid phase is directed to an evaporator for further purification. From the evaporator, the purified CTO is fed to a reactor feed tank.

According to another embodiment suitable for CTO, the purification is performed by using two or three evaporators in the purification. In this embodiment, the first evaporator is a thin film evaporator. In an embodiment the evaporator operates at a temperature of 150 to 200° C., and a pressure of 10 to 20 mbar. The gas phase containing CST and water is separated.

In the purification embodiment which uses two evaporators, the liquid fraction from the first evaporator is led to a second evaporator. A thin film evaporator or plate molecular still can be used. The second evaporator typically operates at a temperature of 300 to 390° C. and a pressure of 001 to 15 mbar. The distillate, i.e. purified CTO is fed to the reactor system for catalytic treatment.

In the purification embodiment that uses three evaporators, the liquid fraction from the first evaporator is led to a second evaporator, which is a thin film evaporator or a plate molecular still. Typical operating conditions include evaporation at a temperature of 200 to 280° C. and a pressure of 5 to 10 mbar. The third evaporator is a short path evaporator. It typically operates at a temperature of 280 to 360° C. and a pressure of 0.1 to 5 mbar. From the last evaporator, the distillate, i.e. purified CTO is fed to the reactor system.

Performing the evaporation in more than one step enables boiling in the evaporation steps following the first step takes place in a more controlled manner because low boiling components do not cause so much migrating of the impurities to the vapor.

Another feature of the CTO evaporation methods mentioned in the embodiments above is that the evaporation is accomplished in such a manner that the amount of residue removed by the purification is very small, typically ranging from 5% to 15%, preferably less than 10% by weight of the feed. The residue comprises CST and water from the heater and/or first evaporator and the heavy pitch separated in the subsequent evaporator.

The CTO purification process conditions are controlled in such a way that as much as possible of the neutral components of the tall oil material are withdrawn with the recovered fractions for further utilization instead of being withdrawn with the residue. This procedure results in an improved yield of the purified CTO raw material compared to prior art processes. Particularly the multistep purification provides controlled and easily adjustable means for feed purification. By removing water and e.g. turpentine compounds first, followed by removal of light components make the following evaporation steps more efficient. After that higher boiling impurities are removed. The removal of light components enables the controlled maintenance of vacuum and utilization of smaller equipment in the subsequent purification step(s). Also the risk of carryover of non-desired residual substances into the distillate fraction in the further evaporation steps is reduced in a controlled way. The purification can be carried out at milder conditions and using smaller volumes.

When this efficient CTO purification is operated in the present process with its combination(s) of HDO and HDW catalysts, a very advantageous over-all process is provided. A high level of complex structures is retained in the purified CTO. These structures are efficiently hydrogenated and cracked by the combined catalysts. Fragments of the cracked complex molecules will make up for the any cracking of long paraffinic chains. Thus the whole CTO feed is put to full use and the fuel product yields from the CTO are high.

After purification the feed is heated and led to the guard bed phase. There are typically from one or more guard catalyst beds arranged in series or in parallel. The guard beds contain active catalyst material, as described above, for the removal of harmful substances from the feed. Hydrogen gas is fed into the guard phase either separately or premixed with the feed. The guard phase is pressurized and heated in order to provide the desired removal of metals, and phosphorus from the feed.

From the guard phase the flow is fed to the main reaction phase. There may be several main catalyst beds operating in series or in parallel in the reactor system. Typically there are one or two main catalyst beds operating in series. In an embodiment the process is designed to operate in such a way that the feed passes through a series of main catalyst beds as a continuous flow without intermediate outlets for by-products or other side streams. The number and size of the reaction vessels can be freely designed to suit the space available, taking into consideration the desired process and flow parameters. Thus, the main reaction phase may comprise one pressure vessel or it may be split into two or more pressure vessels.

The first main catalyst bed in the flow direction typically contains a combination of HDO and HDW catalysts as described above. Additional hydrogen gas is fed to the main phase to provide sufficient reagent for the various hydrogen treatment steps.

A number of chemical reactions take place in the hydroprocessing reactions in the catalyst beds. These reactions are well known as such and are not described in detail herein. The biological compounds containing oxygen, sulphur and nitrogen react with the hydrogen and form water, hydrogen sulphide, ammonia, carbon dioxide and carbon monoxide as by-products. The main hydroprocessing products are paraffinic hydrocarbons in the $C_{16}$-$C_{20}$ range. The long carbon chains of the fatty acids are isomerized, which improves the cold flow properties of the resulting fuel. In the present invention, the isomerisation takes place before, after or simultaneously with the hydrodeoxygenation due to the combination of HDO and HDW catalysts and the packing of the catalyst material. Olefins and aromatic compounds are hydrogenated and fused ring systems are broken. This reduces the complexity of the compounds and improves the quality of the fuel. Cracking of large molecules, side chains and of some of the long chains occurs, results in an increase of smaller useful molecules but also causes an increase in light gas products (methane, ethane, propane and butane).

Since the catalysts are combined in the catalyst bed(s) hydrogenation, isomerisation, hydrodeoxygenation, dearomatisation and hydrocracking take place simultaneously. Since most of the reactions are exothermic, the temperature has a tendency to rise. In an embodiment of the invention hydrogen is fed into the main reaction phase as quench gas to control the temperature. Quench gas may also be added to one or more of the guard beds to ascertain that the temperature does not rise too high.

From the first catalyst bed in the main reaction phase the flow passes to the second catalyst bed, where the proportion of HDO catalyst is typically lower than in the first catalyst bed. In case there are only two catalyst beds in the reactor system, the second bed will comprise mainly or only HDW catalyst. In case there are several beds, the second bed will comprise also HDO catalyst but in a minor proportion compared to the first bed. Typically the last bed in the main catalyst bed series contains only HDW catalyst. This makes it possible to control the isomerisation and to adjust the degree of isomerisation and cracking to a suitable level according to the required ignition and cold flow properties of the fuel product. Further, a more straightforward and simple process is provided where the process parameters can be easily controlled and adjusted when necessary. Less complicated process equipment is needed which also makes the process more cost-effective.

Due to the multifunctional catalyst combination, a complex biological feed material such as CTO, which in addition to fatty acids, resin acids and neutral components contains a number of other organic compounds, can be broken down into a mixture of hydrocarbons which provides an excellent basis for fuel and fuel components. Purification of the CTO further improves the yield and makes the present process into a highly advantageous way of providing green fuel.

In the present process it is not only the paraffins from the fatty acids which are recovered and transformed into good diesel fuel by isomerisation. A good yield of the entire feed is obtained by the simultaneously performed dearomatization and cracking. The various catalytic reactions partly counteract each others effect on the ignition and cold flow properties and the net result is an overall hydroprocessing product with acceptable characteristics for fuel use.

It is characteristic of the HDO and HDW catalysts used in the present invention that sulphur has to be present to maintain the catalytic activity of the catalysts. The zeolite in the HDW catalyst is not sensitive to poisoning by low levels of sulphur. The catalysts are typically sulphided before start up by a sulphur containing compound such as hydrogen sulphide or dimethyl disulphide. Additional sulphur during operation is needed only in case the concentration of organic sulphur in the feed material is too low. When CTO is the feed material, additional sulphur is generally not needed to maintain the catalytic activity of the HDO and HDW catalysts. When additional sulphur is needed, is suitable sulphur compound may be added to the feed.

The amount of hydrogen gas needed for the various hydrotreatment reactions depends on the amount and type of the feed material. The amount of hydrogen needed depends also on the process conditions. Biological oils, fats and waxes typically contain fatty acids and/or triglyceride structures, which are hydrogenated and cracked in the hydrotreatment reaction forming water and long paraffinic carbon chains.

CTO is a biological raw material, which lacks triglyceride structures but does contain fatty acids and other oxygen containing compounds as well as aromatics and olefinic compounds requiring hydrogen for conversion into fuel components.

A suitable amount of hydrogen needed for the hydroprocessing and isomerization can be determined by a person having ordinary skills in the art. Provided that sufficient hydrogen is present to maintain the activity of the catalysts, the hydrogen feed amount is not critical from a technical point of view since excess hydrogen gas which is not consumed in the reactions is recirculated and used as feed and quench gas.

In the present invention, the pressure in the reactor can vary from about 10 to about 250 bar, preferably about 80 to about 110 bar.

The HDO and HDW treatments in the reactor are carried out at a temperature in the range of about 280° C. to about 450° C., preferably at about 350° C. to about 40° C.

The feed material is pumped to the reactor at a desired speed. The feed rate WHSV (weight hourly spatial velocity) of the feed material is proportional to an amount of the catalyst: the WHSV is calculated according to the following equation:

$$WHSV[h^{-1}] = \frac{V_{feed[g/h]}}{m_{catalyst[g]}}$$

wherein $V_{feed[g/h]}$ means the pumping velocity of the feed material, and $m_{catalyst[g]}$ means the amount of the catalyst.

The WHSV of the feed material in the present invention varies between 0.1 and 5, and is preferably in the range of 0.3-0.7.

The ratio of $H_2$/feed in the present invention varies between 600 and 4000 Nl/l, and is preferably in the range of 1300-2200 Nl/l.

The hydroprocessing steps are highly exothermic reactions in which the temperature can rise to a level which is detrimental to the stability of the catalyst and/or product quality. In some cases, it may be necessary to control the temperature variations. Recirculation of at least a portion of the liquid hydrocarbon product stream and/or effluent gas provides an efficient means for constraining the exothermic reaction whereby the recycled streams act as media for lowering the temperature of the catalyst beds in a controlled manner.

The hydrocarbon mixture obtained from the reactor system includes fuel grade hydrocarbons having a boiling point of at most 380° C. according to ISO EN 3405.

The product from the hydroprocessing reactor system is drawn off from the outlet of the last main catalyst bed. In one embodiment of the invention water and light gases containing hydrogen, light hydrocarbons, $H_2S$, CO and $CO_2$ are separated from the liquid hydrocarbon product. The separation may be performed e.g. by cooling or flashing. Water and gases may also be separated by other means which are well known to those skilled in the art.

In an embodiment of the invention the light gases are directed for purification to an amine scrubber, which removes $H_2S$ and $CO_2$ from the gaseous products The scrubbed gases, comprising mainly hydrogen and some impurities, are recycled to the process as feed hydrogen and quench gas.

The liquid reaction products, i.e. the mixture of higher (>C5) hydrocarbons from the separator are fed to a separation column where different fuel grade hydrocarbon fractions are recovered. From the bottom of the separation column, the heavier hydrocarbons may be recycled back to the inlet end of the apparatus and mixed into the feed before the guard reactors.

The person skilled in the art is able to vary the distilling conditions and to change the temperature cut point as desired to obtain any suitable hydrocarbon product.

The recovered middle distillate fraction may comprise gas oil, i.e. a hydrocarbon fraction having a boiling point in the diesel range. A typical boiling point is from 160° C. to 380° C., meeting characteristics of the specification of EN 590 diesel. The diesel product may be fed to a diesel storage tank. Also hydrocarbon fractions distilling at temperatures ranging from 40° C. to 210° C. and at a temperature of about 370° C. can be recovered. These fractions are useful as high quality gasoline fuel and/or naphtha fuel, or as blending components for these fuels.

The process of the present invention can be realized in any typical apparatus for producing biofuel or biofuel components, which includes the specific catalyst bed(s) of the invention. An apparatus adapted for realizing an embodiment of the process of the invention comprises a catalytically active guard phase and main reaction phase. At least one of said phases comprises a catalyst bed, in which HDO and HDW catalysts are combined with each other. In an embodiment of the invention, the catalysts are mixed with each other either by physical mixing of catalyst particles or by providing both types of catalysts on the same support material.

A main reaction phase for use in the hydrodeoxygenation and hydrodewaxing process of the invention may comprise inert layers and trap layers for distributing the flow and/or trap impurities in addition to the active catalyst bed(s) with a combination of HDO and HDW catalysts.

Between the active catalyst beds there may be provided space for the introduction of cooling quench gas. Quench gas may also be introduced into the active bed(s).

FIG. 1 shows a diagram illustrating an embodiment of the process of the invention. In the process, fresh feed material 1 is fed to a feed tank 2. The feed may be purified by various means (not shown) before or after tank 2 towards the reactor system 5. The fresh feed is combined with a heavy fraction 12 recirculated from the fractionation 8. The feed is mixed with hydrogen and directed to the guard bed phase of the reactor system 5.

The guard bed phase comprises bed(s) with active catalyst(s) for removal of harmful compounds such as metals and phosphorus. One or more of the guard beds may comprise a catalyst bed in which HDW catalyst is mixed with HDO catalyst. The harmful compounds are retained in the guard bed(s).

From the guard phase the flow passes on to the main reaction phase in the reactor system 5 and is mixed with additional hydrogen to maintain hydrogen pressure and to cool the flow.

The main reaction phase comprises one or more active catalyst beds for the hydroprocessing. At least one catalyst bed comprises a combination of HDO and HDW catalysts. The catalysts comprise for example NiMo/$Al_2O_3$ as HDO catalyst and NiW/zeolite/$Al_2O_3$ as HDW catalyst. When there are more than one catalyst beds, the last bed of the main reaction phase comprises only HDW catalyst.

From the bottom of the reactor system 5, the hydroprocessing product passes to a separator 6 for separating water and light gases from the liquid hydrocarbon product flow. After purification a part of the gases are recycled to the inlet end of the reactor system 5 to provide hydrogen reagent as well as quench gas (not shown) for cooling the main and/or guard reactors. Fresh make-up hydrogen is provided from hydrogen source 7.

The liquid hydrocarbon product flow is passed on to a fractionator 8, where the distillation provides hydrocarbon fractions boiling in desired ranges. Typically a middle distillate or diesel fraction is recovered at 9, a naphtha fraction is recovered at 10, a light fraction is recovered at the top 11 and a heavy fraction is taken out at the bottom 12. All or a part of the heavy fraction is recirculated to the fresh feed line and fed into the reactor system 5.

The following examples are presented for further illustration of embodiments of the invention.

Reference Example 1

Crude tall oil is processed in a laboratory scale reactor packed with HDO catalyst containing NiMo/$Al_2O_3$. The reaction conditions are shown in Table 1.

TABLE 1

| Parameter | Value |
| --- | --- |
| WSHV | 0.49 |
| $H_2$/CTO rate (Nl/l) | 1973 |
| Pressure (bar) | 90 |
| Temperature (° C.) | 369 |

The distillate of the liquid hydrocarbon product is bright in color and has the data shown in Table 2.

TABLE 2

| Yield result | Value (C.°) |
| --- | --- |
| IBP | 247 |
| 5 | 304 |
| 10 | 297 |
| 15 | 304 |
| 20 | 305 |
| 30 | 309 |
| 40 | 311 |
| 50 | 314 |
| 60 | 318 |
| 70 | 326 |
| 80 | 341 |
| 85 | 360 |
| 90 | 386 |
| FP | 61 |
| CP | +16 |
| CFPP | +10 |

Figure 2:
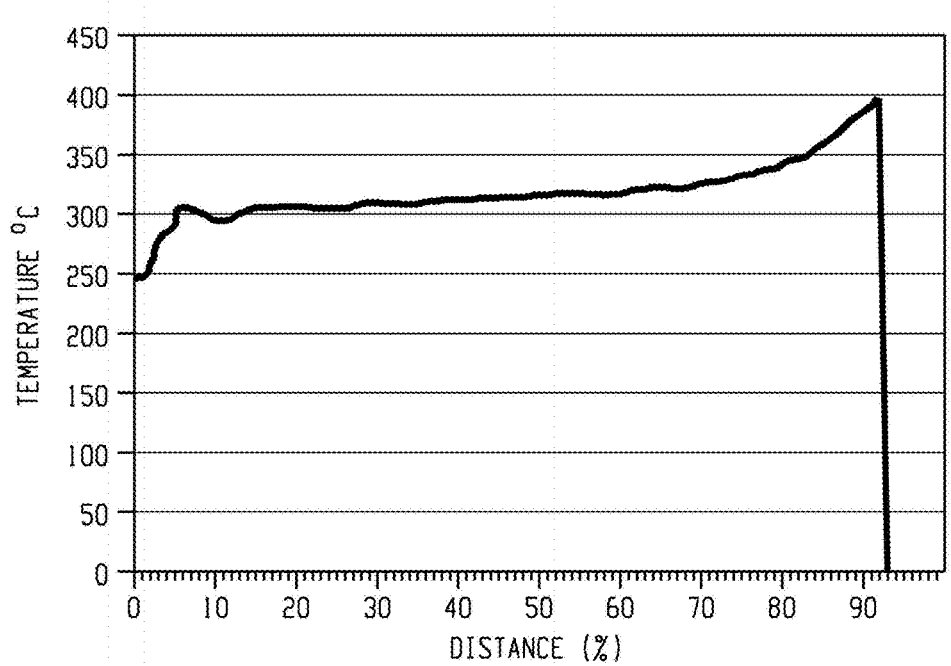
FIG. 2 is a distillation curve of the distillate of Reference Example 1.

A distillation curve of the distillate is shown in FIG. 2.

The result obtained with the HDO catalyst alone are not satisfactory for fuel use because of its poor cold flow properties. The ratio of iso to n-paraffines is 0.5. A residue of 7% of the product does not distill at all at the temperatures used.

Reference Example 2

Crude tall oil is processed in a laboratory scale reactor packed with HDW catalyst containing NiW/$Al_2O_3$. The reaction conditions are shown in Table 3.

TABLE 3

| Parameter | Value |
| --- | --- |
| WSHV | 0.68 |
| $H_2$/CTO rate (Nl/l) | 1260 |
| Pressure (bar) | 80 |
| Temperature (° C.) | 369 |

The distillate of liquid hydrocarbon product has the data shown in Table 4.

TABLE 4

| Yield result | Value (C.°) |
| --- | --- |
| IBP | 94 |
| 5 | 130 |
| 10 | 152 |
| 15 | 170 |
| 20 | 190 |
| 30 | 231 |
| 40 | 263 |
| 50 | 279 |
| 60 | 287 |
| 70 | 293 |
| 80 | 298 |
| 85 | 300 |
| 90 | 305 |
| 95 | 317 |
| FBP | 333 |
| FP | 61 |
| CP | −8 |
| CFPP | −2 |

Figure 3:
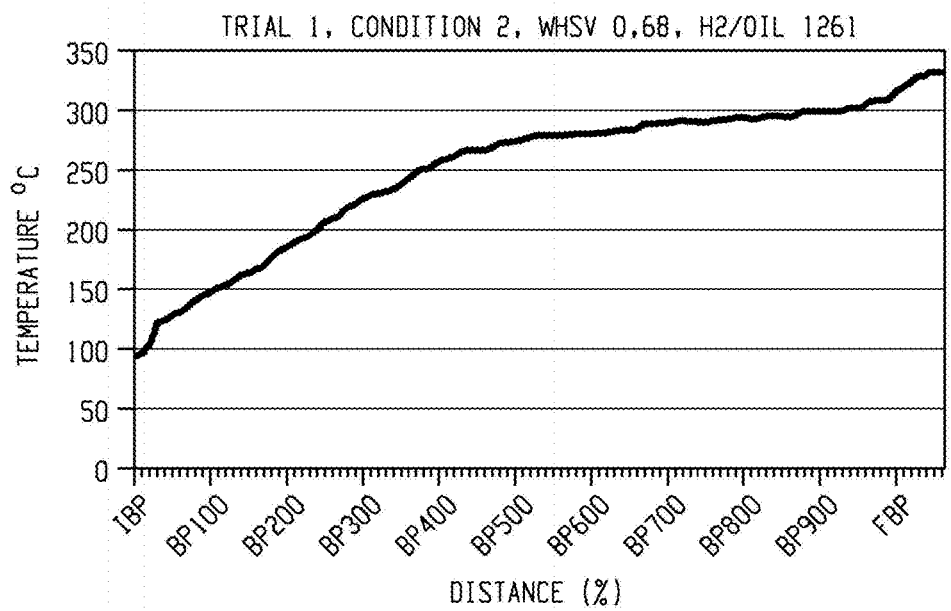
FIG. 3 is a distillation curve of the hydrocarbon yield of Reference Example 2.

A distillation curve of the hydrocarbon yield is shown in FIG. 3.

The result obtained with the HDW catalyst alone has fairly good cold flow properties. The iso to n-paraffin ratio is 2.6. However, the yield of middle distillate product is not satisfactory.

Reference Example 3

Crude tall oil is processed in a laboratory scale reactor packed with a HDO and HDW catalyst. The HDO catalyst comprises 21 g of $NiMo/Al_2O_3$ and HDW catalyst comprises 6 g of $NiW/Al_2O_3$. The reaction conditions are shown in Table 5.

TABLE 5

| Parameter | Value |
| --- | --- |
| WSHV ($h^{-1}$) | 0.6 |
| $H_2$/CTO rate (Nl/l) | 1310 |
| Pressure (bar) | 70 |
| Temperature (° C.) | 373 |

The liquid hydro carbon product has the data shown in Table 6.

TABLE 6

| Yield result | Value (C.°)<br>Total hydrocarbons |
| --- | --- |
| IBP | 105 |
| 5 | 148 |
| 10 | 173 |
| 15 | 201 |
| 20 | 229 |
| 30 | 273 |
| 40 | 292 |
| 50 | 299 |
| 60 | 303 |
| 70 | 309 |
| 80 | 316 |
| 85 | 325 |
| 90 | 346 |
| 95 | 393 |
| FBP | 398 |

Figure 4:
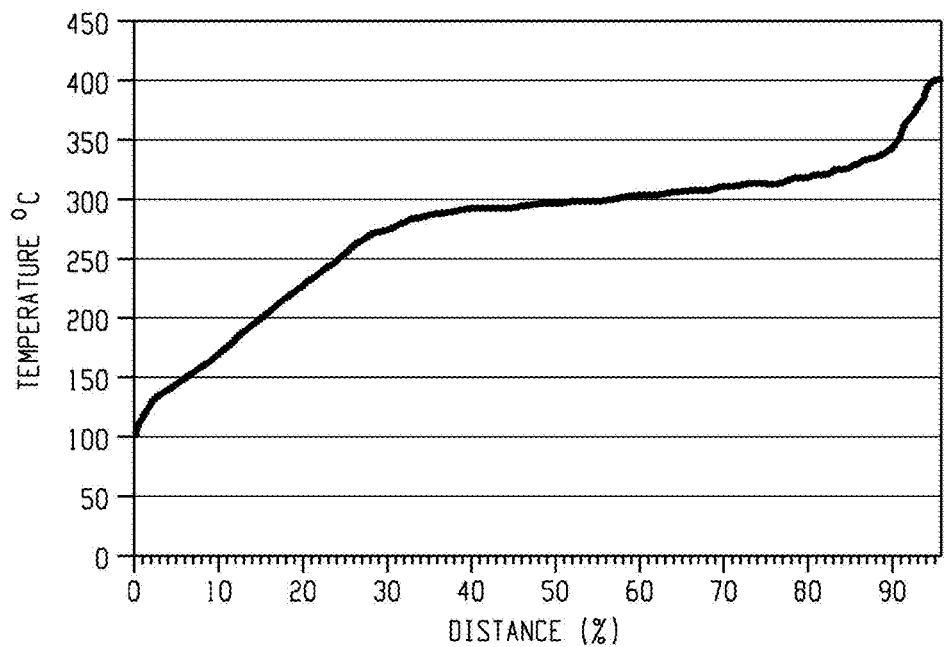
FIG. 4 is a distillation curve of the product of Reference Example 3.

The distillation curve is shown in FIG. 4. The curve indicates a good distribution of paraffinic hydrocarbons and a good middle distillate yield. However, the ratio of iso to n paraffins is about 1 and the cold flow properties of the middle distillate are not satisfactory for diesel fuel use. The residue comprises 1.6%.

Example 1

The compositions of four catalyst layers of a main reaction phase of a reactor system for use in the process according to the invention are shown in Table 7.

TABLE 7

| Layer No. | NiW/zeolite/$Al_2O_3$<br>(w %) | NiMo/$Al_2O_3$<br>(w %) |
| --- | --- | --- |
| 1 | 20 | 80 |
| 2 | 90 | 10 |
| 3 | 95 | 5 |
| 4 | 100 | 0 |

Example 2

Crude tall oil is purified by a three-step evaporation procedure at reduced pressures and elevated temperatures. The purification removes 4% of the light fraction and 6% of the heavy pitch fraction providing 90% of the crude tall oil as purified CTO.

The purified CTO is combined with a stream of heavy distillate from a hydrocarbon fractionation stage and fed into a pilot reactor system according to the invention together with hydrogen gas.

The reactor system contains a guard bed phase with two catalyst beds in series. The guard beds are packed with catalysts containing Ni, Mo and W as active metals and $SiO_2$ and $Al_2O_3$ as carrier materials and metal scavengers.

From the guard beds the purified feed flows into the main reaction phase, which comprises four catalyst beds as described in Example 1. Additional hydrogen is fed into the main reaction phase together with the feed. Hydrogen gas is also introduced between the catalyst beds.

The reaction conditions in the main reaction phase are shown in Table 8.

TABLE 8

| Parameter | Value |
| --- | --- |
| WSHV | 0.60 |
| $H_2$/feed rate (Nl/l) | 1480 |
| Pressure (bar) | 90 |
| Temperature (° C.) | 365 |

Water and light gaseous fractions are separated from the hydroprocessing product. The distillate of the liquid hydrocarbon product has the data indicated in Table 9 below.

TABLE 9

| Yield result | Value (C.°) |
| --- | --- |
| IBP | 92 |
| 5 | 114 |
| 10 | 132 |
| 15 | 146 |
| 20 | 159 |
| 30 | 191 |
| 40 | 224 |
| 50 | 256 |
| 60 | 275 |
| 70 | 286 |
| 80 | 294 |
| 85 | 298 |
| 90 | 303 |
| 95 | 314 |
| FBP | 335 |

Figure 5:
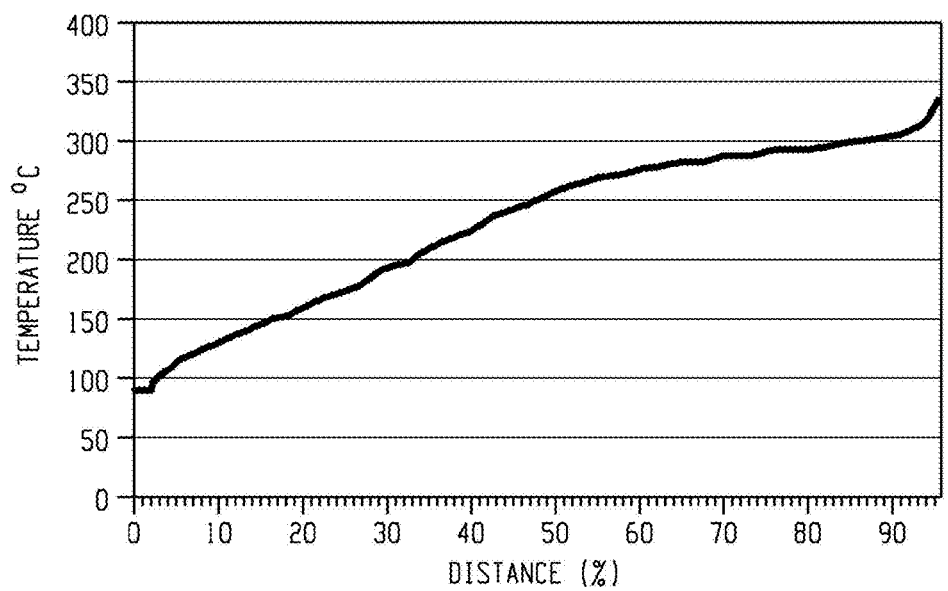
FIG. 5 is a distillation curve of the product of Example 2.

A distillation curve is shown in FIG. 5.

The liquid hydrocarbons are distilled into a light fraction, a middle distillate fraction and a heavy fraction.

The middle distillate provided by the process has characteristics of EN-590 diesel as indicated below in Table 10.

TABLE 10

| Residue (%) | 1.3 |
| --- | --- |
| Initial bp (° C.) | 170 |
| Final bp (° C.) | 340 |
| 50% (v/v) recovered at (° C.) | 276 |
| 90% (v/v) recovered at (° C.) | 306 |
| 95% (v/v) recovered at (° C.) | 318 |
| Paraffins % | 94 |
| Aromatics % | 6 |
| Cetane number | 57 |
| FP (° C.) | 63 |
| CP (° C.) | −7 |
| CFPP (° C.) | −12 |

The invention claimed is:

1. A process for producing biofuel or biofuel components, comprising:
   a first step of feeding of biological material comprising tall oil, crude tall oil, tall oil fatty acids, tall oil derivative(s) or mixtures thereof into a reactor system, which comprises a) a catalytically active guard bed phase and b) a catalytically active main reaction phase and wherein the catalytically active guard bed phase comprises at least one catalyst bed comprising catalytically active material for removing of metals, sulphur and phosphorus, and said catalytically active material is selected from the group consisting of Ni, Co, Mo, W, zeolites, $Al_2O_3$, $SiO_2$ and mixtures thereof; and
   the catalytically active main reaction phase comprises at least one catalyst bed comprising a combination of hydrodeoxygenating (HDO) and hydrodewaxing (HDW) catalysts, wherein the proportion of HDW catalyst content, based on total content of HDW and HDO catalysts, grows towards the outlet end of the reactor system, the HDO catalyst is selected from the group consisting of NiMo, CoMo and a mixture of Ni, Mo and Co, and the HDW catalyst is a NiW catalyst, and wherein the catalytic activity of the guard bed catalysts is lower than that of the main phase catalysts;
   a second step of treating the feed material catalytically with hydrogen in the reactor system to cause hydrodeoxygenation, isomerization and cracking of feed material components to provide a hydroprocessing product, and
   a third step of recovering at least a fraction of the hydroprocessing product as biofuel or biofuel components.

2. The process according to claim 1, wherein the combination of HDO and HDW catalysts comprises mixture(s) or layers of the catalysts.

3. The process of claim 2, wherein said mixture(s) is/are provided by physically mixing HDO and HDW catalyst particles or by adding HDO and HDW catalyst metals onto the same support material.

4. The process of claim 1, which comprises the step of purifying a feed comprising crude tall oil by two or more evaporative purification steps prior to feeding into said reactor system.

5. The process of claim 1, wherein the HDO catalyst is selected from the group consisting of NiMo, CoMo and a mixture of Ni, Mo and Co on a support selected from $Al_2O_3$, $SiO_2$ and $ZrO_2$, and the HDW catalyst is selected from NiW/$Al_2O_3$ and NiW/zeolite/$Al_2O_3$.

6. The process of claim 1, wherein the HDO catalyst comprises NiMo/$Al_2O_3$ and the HDW catalyst comprises NiW/zeolite/$Al_2O_3$.

7. The process of claim 1, wherein the main reaction phase comprises two or more main catalyst beds with their respective combinations of HDO and HDW catalysts.

8. The process of claim 1, wherein the main reaction phase comprises two or more main catalyst beds, which operate in series.

9. The process of claim 1, wherein the reactor system comprises two or more guard catalyst beds, wherein HDW catalyst is combined with HDO catalyst in at least one of the guard catalyst beds.

10. The process of claim 1, wherein the feed after the guard bed phase passes through the main catalyst beds of the reactor system in series as a continuous flow without outlets for byproducts or other side streams.

11. The process of claim 1, wherein water is separated from the hydroprocessing product by cooling.

12. The process of claim 1, wherein hydrogen sulfide and carbon dioxide are separated from the gaseous hydroprocessing products by amine scrubbing.

13. The process of claim 1, wherein a diesel fraction and a naphtha fraction are recovered and a heavy fraction is recirculated to the inlet end of the guard bed phase or the main reaction phase.

* * * * *